No. 736,261. PATENTED AUG. 11, 1903.
E. HUBER.
GRAIN SIEVE.
APPLICATION FILED MAR. 3, 1902.
NO MODEL. 2 SHEETS—SHEET 1.

WITNESSES: INVENTOR
Edward Huber
By H. A. Toulmin,
ATTORNEY.

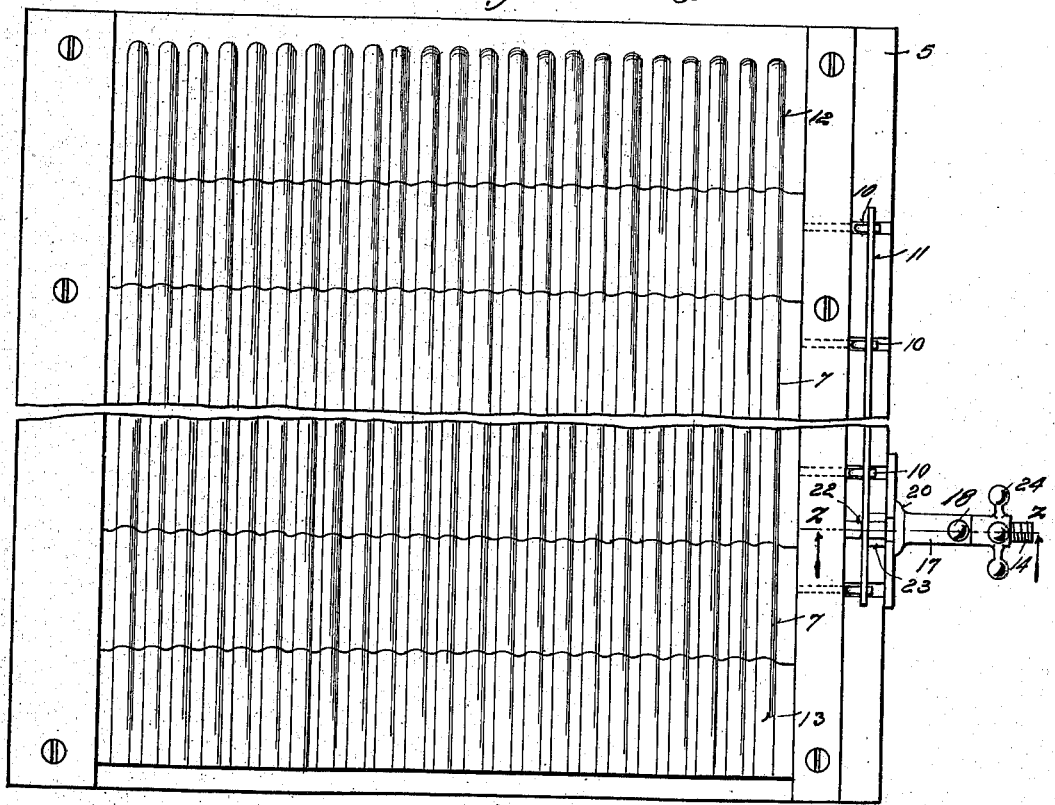

No. 736,261.

Patented August 11, 1903.

UNITED STATES PATENT OFFICE.

EDWARD HUBER, OF MARION, OHIO.

GRAIN-SIEVE.

SPECIFICATION forming part of Letters Patent No. 736,261, dated August 11, 1903.

Application filed March 3, 1902. Serial No. 96,443. (No model.)

*To all whom it may concern:*

Be it known that I, EDWARD HUBER, a citizen of the United States, residing at Marion, in the county of Marion and State of Ohio, have invented certain new and useful Improvements in Grain-Sieves, of which the following is a specification, reference being had therein to the accompanying drawings.

This invention relates to grain-sieves, and has for its object to provide a sieve or screen for grain-separators which shall be efficient in operation and by means of which the separation may be readily controlled while the apparatus is at work.

To these ends my invention consists in certain novel features, which I will now proceed to describe and will then particularly point out in the claims.

Figure 1:
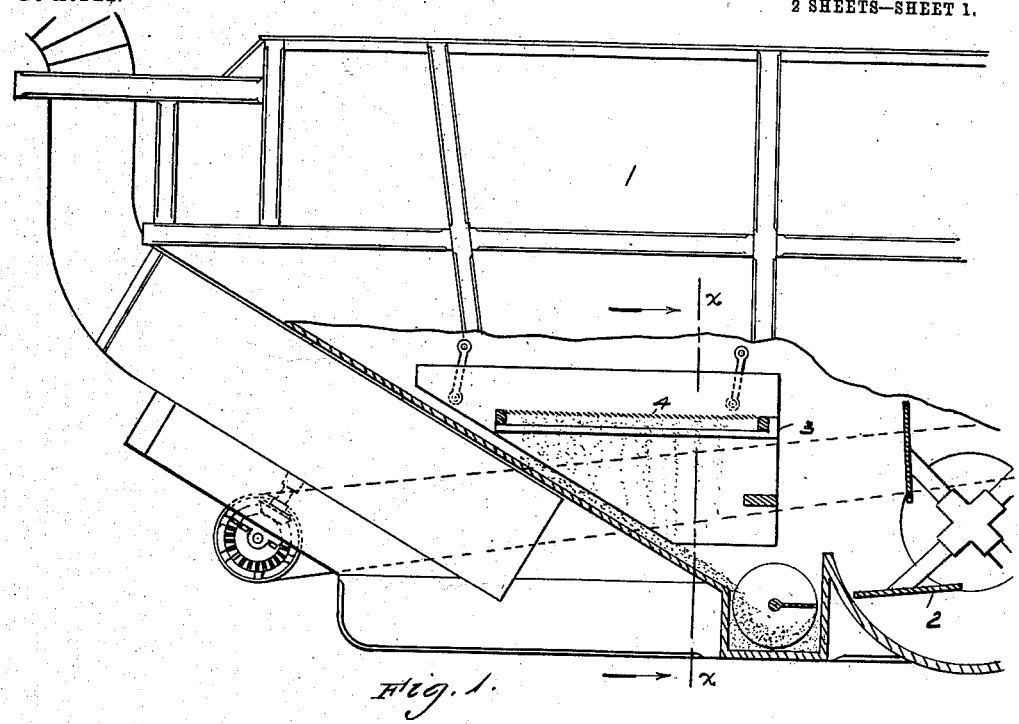
Figure 2:
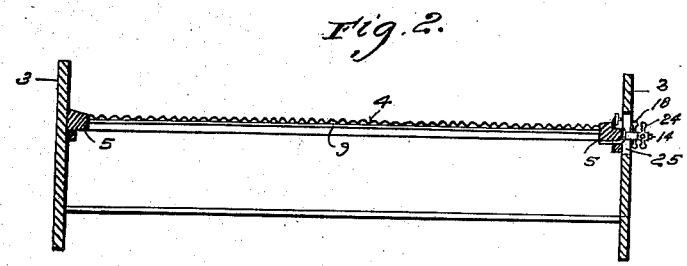

In the accompanying drawings, Figure 1 is a side elevation, partly in vertical section, of a threshing-machine having my improved sieve applied thereto. Fig. 2 is an enlarged sectional view taken on the line $xx$ of Fig. 1 and looking in the direction of the arrows. Fig. 3 is a plan view of the sieve detached and partly broken away. Fig. 4 is an end elevation. Fig. 5 is a sectional view taken on the line $yy$ of Fig. 4 and looking in the direction of the arrows, and Fig. 6 is a detail sectional view taken on the line $zz$ of Fig. 3 and looking in the direction of the arrows.

In Figs. 1 and 2 I have shown my improvement as applied to a threshing-machine 1, having the usual blast-fan 2 and shaking-shoe 3, in which the sieve proper, 4, is mounted. This latter consists of a framework 5, in which are mounted a plurality of plates or slats 6, extending transversely of the sieve. Each slat or plate is composed of an upper rear portion 7, corrugated or grooved, as shown, and of a lower or forward portion 8, which is a flat or plane surface. The upper portion of this flat or plane surface 8 lies in the same plane with the extreme lower portions or bottoms of the grooves in the corrugated portion of the plate, so that no pockets or shoulders are formed at the lower front ends of said grooves, and the grain does not accumulate at these points, but passes freely out from the grooves onto the flat or plane portion 8. Each slat or plate 6 is mounted upon a transverse rock-shaft 9, and these rock-shafts are provided at one end with crank-arms 10, which are journaled in a rocking bar 11, by means of which all of the rock-shafts may be simultaneously oscillated, so as to tilt or adjust the slats or plates to any desired position. It will be observed that each slat or plate overlaps the succeeding slat or plate to an extent greater than the width of the flat or plane portion 8, and it will also be observed that the corrugations of the several slats or plates are coincident, so that when the rock-shafts are turned in the proper direction to the proper extent the corrugations of each slat or plate will fit within those of the adjacent slat or plate and permit the sieve to be entirely closed. The frame 5 is provided with a fixed corrugated plate 12 at its front end, which extends over the front slat 6 in such a way as to prevent any chaff or other material from becoming engaged between said slat and the front cross-bar of the frame. A similar fixed corrugated plate 13 is located at the rear cross-bar of the frame to receive the end of the rear slat 6.

In order to operate the rocking bar 11 and to secure the parts after adjustment, I prefer to employ the construction shown in detail in Figs. 3, 4, and 6, in which 14 indicates a bolt passing through one of the side bars of the frame 5 and which may be provided with a polygonal head 15, fitting in a similarly-shaped recess 16 in the inner face of the side bar, so as to prevent said bolt from turning. Upon this bolt is mounted a sleeve 17, provided with a handle 18, by means of which it may be readily rotated, the inner end of said sleeve extending into a socket or bearing 19, formed in the side bar of the frame. The sleeve 17 is provided with a collar 20, which bears against a wearing-plate 21 on the outer face of the side bar of the frame. Near its inner end the sleeve 20 is provided with a crank-arm 22, which extends up through a slot 23 in the side bar of the frame and engages the rocking bar 11. In this construction the outer end of the bolt 14 is threaded, and there is mounted thereon a hand-nut 24, which is adapted to bear against the end of the sleeve 17, and by drawing the collar 20 of said sleeve against the plate 21 as an abutment serves to clamp and hold stationary the said sleeve after adjustment.

The shoe 3 is provided with an opening 25, by means of which access may be had to the handle 18 and hand-nut 24.

By reason of the construction of the slats or plates 6 an efficient separation is assured. As the grain, chaff, and straw are delivered on the sieve the grain passes down into the grooves of the corrugations, while the straw and other large impurities rest on top of the ribs, where they are exposed to the blast and are thereby carried out over the rear end of the sleeve. The grain, on the other hand, together with such impurities as may accompany it, passes down along the grooves until it comes to the flat or plane portions of the slats, where it is spread out over the same, and thus thoroughly exposed to the air-blast, which blows out the dirt or fine particles of material other than grain which may have passed down along the corrugations with the grain. The grain thus separated drops from the lower edges of the slats, while the finer impurities are blown out by the blast, to which the grain has thus been exposed practically a second time and more thoroughly than when in the corrugations. By reason of the adjustability of the slats their inclination and the space separating them, through which the blast operates, may be regulated as desired, and by reason of the particular mechanism described for controlling this adjustment the angular position of the slats may be readily altered as desired without interrupting the operation of the machine, it being a simple matter to loosen the hand-nut 24, turn the sleeve 17 to the desired position by means of the handle 18, and then lock the parts in position by again screwing up the hand-nut. This arises from the fact that the adjusting and locking devices are simple in construction and readily operated from the outside of the shoe.

I do not wish to be understood as limiting myself to the precise details of construction hereinbefore described, and shown in the accompanying drawings, as these details may obviously be modified without departing from the principle of my invention.

I make no claim in the present application to the subject-matter herein shown, which is claimed in the application bearing the Serial No. 103,034.

Having thus fully described my invention, what I claim as new, and desire to secure by Letters Patent, is—

1. A grain-separator composed of transverse inclined slats or plates, each having a corrugated rear upper portion and a flat or plane lower portion, said flat or plane portion merging into the bottoms of the grooves of the corrugated portion on a level with said bottoms, whereby the formation of pockets is avoided, substantially as described.

2. A grain-sieve comprising a frame, transverse rock-shafts mounted therein, means for operating said rock-shafts, and slats or plates secured to said rock-shafts, extending transversely of the sieve and each comprising an upper rear corrugated portion and a front lower plane portion having its upper surface merging into the bottoms of the grooves of the corrugated portion on a level therewith, to avoid the formation of pockets, said plates overlapping, so that the corrugated portion of one plate extends rearwardly beyond the plane portion of the following plate, its forward edge lying wholly beyond the rear edge of the following plate and the corrugations of the successive plates being coincident, whereby the sieve may be entirely closed, substantially as described.

3. In a grain-sieve, the combination, with a frame, rock-shafts mounted therein and provided with crank-arms, slats or plates secured to said rock-shafts, and a rocking bar connected with the crank-arms, of an adjusting device comprising a bolt mounted in a fixed position in the frame at right angles to the rocking bar, a sleeve journaled on said bolt and having an end bearing on the frame, said sleeve being provided with an operating-handle and with a crank-arm engaging the rocking bar, and a hand-nut mounted on the threaded outer end of the bolt and adapted to clamp the sleeve in position against its bearing after adjustment, substantially as described.

4. In a grain-sieve, the combination, with a frame, rock-shafts mounted therein and provided with crank-arms, slats or plates secured to said rock-shafts, and a rocking bar connected with the crank-arms, of an adjusting device comprising a bolt mounted in a fixed position in the frame at right angles to the rocking bar, a sleeve journaled on said bolt and having an end bearing on the frame, said sleeve being provided with an operating-handle and with a crank-arm engaging the rocking bar, and a hand-nut mounted on the threaded outer end of the bolt and adapted to clamp the sleeve in position against its bearing after adjustment, and a shoe in which said sleeve is mounted, said shoe being provided with an aperture by means of which access may be had to the adjusting devices, substantially as described.

5. In a grain-sieve, the combination, with a frame, rock-shafts mounted therein and provided with crank-arms, slats or plates secured to said rock-shafts, and a rocking bar connected with the crank-arms, of an adjusting device comprising a bolt mounted in a fixed position in the frame at right angles to the rocking bar, a sleeve journaled on said bolt and provided with an operating-handle and with a crank-arm engaging the rocking bar, and means for clamping the sleeve in position after adjustment, substantially as described.

In testimony whereof I affix my signature in presence of two witnesses.

EDWARD HUBER.

Witnesses:
JOHN J. CRAWLEY,
J. ROSTEN CURTIS.